United States Patent [19]

Apley et al.

[11] Patent Number: 4,959,801
[45] Date of Patent: * Sep. 25, 1990

[54] OUTLINE-TO-BITMAP CHARACTER GENERATOR

[75] Inventors: Philip G. Apley, Allston; David A. Berlow; John S. Collins, both of Boston, all of Mass.

[73] Assignee: Bitstream Inc., Cambridge, Mass.

[ * ] Notice: The portion of the term of this patent subsequent to Nov. 15, 2005 has been disclaimed.

[21] Appl. No.: 257,636

[22] Filed: Oct. 14, 1988

Related U.S. Application Data

[63] Continuation of Ser. No. 827,239, Feb. 7, 1986, Pat. No. 4,785,391.

[51] Int. Cl.$^5$ ............................................... G06F 3/14
[52] U.S. Cl. ..................................... 364/518; 340/720; 340/723; 340/730; 364/521
[58] Field of Search ............................... 364/518–523; 340/720, 723, 727, 750, 730

[56] References Cited

U.S. PATENT DOCUMENTS

| | | | |
|---|---|---|---|
| 4,254,468 | 3/1981 | Craig | 364/521 |
| 4,553,214 | 11/1985 | Dettmer | 364/521 |
| 4,674,059 | 6/1987 | Schrieber | 364/523 |
| 4,675,830 | 6/1987 | Hawkins | 364/518 |
| 4,785,391 | 11/1988 | Apley et al. | 364/521 X |

OTHER PUBLICATIONS

J. Flowers, "Digital Type Manufacture: An Interactive Approach," I.E.E.E. Computer, vol. 17, No. 5, May 1984, 40–48.

W. Richmond, "Digital Masters," Communication Arts, May–Jun. 1984, pp. 78–81.

*Primary Examiner*—Gary V. Harkcom
*Assistant Examiner*—H. R. Herndon
*Attorney, Agent, or Firm*—Wolf, Greenfield & Sacks

[57] ABSTRACT

A system and data structure for generating bitmap representations of characters and symbols from their outline representations. The outline representation is treated as being composed of a hierarchy of zones formed in both the horizontal and vertical directions. The zones are completely character-specific. Each zone defines the extent of some feature of the character. The zonal definition of the character comprises part of the information in the data structure. In generating the bitmap, the boundaries of the zones are mapped to specific pixel locations in a bitmap em-square of selected resolution and size. The available pixels are then allocated to the zones. After each level of zone has received its pixel allocation, the pixels assigned thereto are then distributed among the next lower level of zones and the process is repeated iteratively until all zones have received their pixel allocations or it is no longer possible to make allocations. To maintain relationships between features, features of characters (both within individual characters and between different characters) may be linked in the data structure so as to be defined in terms of the features of the same or other characters. The features are linked at the outline description level, so that the linking need be specified only once and will thereafter be useful any time a bitmap is to be generated from the outline.

8 Claims, 4 Drawing Sheets

SWISS_SLABSERIF_722_SERIFA_BOLD ←120

```
122→181    ; NUMBER OF CHARACTERS
123→001    ; CHARACTER ID
128x→4     ; NUMBER OF X ZONES
    ; FROM    TO   P L C  MIN FSIZE      FUNCTION  ⎫
         0  6412  1 1 0    3    0                  ⎬ 124
      3341  6412  0 1 1    1    0                  ⎪
         0  2970  0 1 1    1    0                  ⎪
      2970  3341  0 1 0    1    0                  ⎭
128y→8     ; NUMBER OF Y ZONES
    ; FROM    TO   P L C  MIN FSIZE      FUNCTION
                                        132   134    136   138
     -2043  6597  1 1 0    4    0       ⏞      ⏞     ⏞     ⏞
     -2043     0  0 1 1    1    4      2.100 F001~1 P008~1 C0   ⎫
      5670  6597  0 1 1    0    4      1.100 F001~2 P008~3 C0   ⎬ 126
         0  5670  1 1 0    3    0                               ⎪
         0   844  0 1 1    1    4      1.100 F001~4 P008~4 C0   ⎪
      1755  2582  0 0 1    1    4      0.510 F001~5 P008~5 C0   ⎪
      2582  5670  0 1 1    1    4      0.750 F001~6 P008~7 C0   ⎭
       844  1755  0 1 0    1    0
     →002    ; CHARACTER ID
142→7      ; NUMBER OF X ZONES
    ; FROM    TO   P L C  MIN FSIZE      FUNCTION
         0  5602  1 1 0    4    0
      3982  5214  0 1 1    1    4      0.750 F002~1 P015~1 C0
       911  2109  0 0 1    1    4      0.750 F002~2 P008~1 C0
      2109  3982  0 1 1    1    0
       186   911  0 1 1    1    0
      5214  5602  0 1 1    0    0
         0   186  0 1 0    0    0
       9    ; NUMBER OF Y ZONES
    : FROM    TO   P L C  MIN FSIZE      FUNCTION
     -2043  6597  1 1 0    6    0      2.100 F002~1 P008~1 C0
     -2043     0  0 1 1    1    4      1.100 F002~2 P008~3 C0
      5636  6597  0 1 1    0    4      1.100               144  146   148 150 152   156   158
         0  5636  1 1 0    5    0                          ⏞    ⏞      ⏞       ⏞    ⏞
         0   844  0 1 1    1    4      1.100 F002~4 F002~6 + 0.5 * P008~4 C0
      2514  3291  0 0 1    1    4      0.510 F002~5 P008~5 C0
      4843  5636  0 0 1    1    4      1.100 F002~4 F002~6 + 0.5 * P008~4 C0
      3291  4823  0 1 1    1    0                                 ⎵
       844  2514  0 1 0    1    0                                154
```

ETC. . . .

FIG. 11

OUTLINE-TO-BITMAP CHARACTER GENERATOR

CROSS-REFERENCE TO RELATED APPLICATION

This application is a continuation of Ser. No. 06/827,239, filed Feb. 7, 1986 and titled "AUTOMATED BITMAP CHARACTER GENERATION FROM OUTLINES," now U.S. Pat. No. 4,785,391.

BACKGROUND OF THE INVENTION

1. Field of the Invention

This invention relates to the art of generatinq digital representations of alpha-numeric characters or other symbols. More particularly, it relates to the generation of bitmap representations of characters at selectable resolutions and point sizes, from digital representations of their outlines.

2. Discussion of the Prior Art

The field of electronic typographic and image composition has given birth to a large variety of display devices and printing systems for making visible in printed or other form (e.g., on a video display screen) alphanumeric and other characters and symbols. (Hereafter the term "output device" will be used generically, to include all types of print and non-print output devices.) This field includes, but is not limited to, electronic typesetting and publishing systems, full page composition systems, word processing systems, and all of their output devices. In such systems, each character or symbol must be supplied, at some point in the systems, as digital information from which the character form may be constructed on each output device. The digital data will generally have to be compiled or generated in a way which takes into account specific characteristics of the output device, such as its resolution, and specific characteristics of the image to be displayed, such as the point size desired for typographic material.

A large number of typefaces are in popular use. The generation of each character or symbol in each typeface desired, at each point size to be used, can be a substantial undertaking. For a small manufacturer, the cost of developing all of this material could make the effort quite impractical. And when a new output device is developed, with different characteristics, it could be necessary to prepare a new digital data set for characters adapted thereto. This can make it quite expensive to take advantage of improvements in output technology as they become available.

Fortunately, it is not necessary to start "from scratch" each time a character set, font, or symbol is needed. Digital forms of a large number of typefaces and other symbols are available from a number of suppliers. However, these suppliers frequently will not have a digital representation in a form which meets the user's requirements or the characteristics of his output device. The typeface supplier generally wants to establish as its "master" digital version of a character a form which is as close to an analog form as possible—that is, a form which is virtually independent of output device characteristics and the point size at which characters are to be viewed. The most frequently employed approach is to store an encoded representation of the outlines of each of the characters. The location of the outline is defined using a normalized coordinate system whose resolution is considerably finer than the resolution of any conceivable output device for any reasonable selection of point size. Several techniques are available for encoding character outlines. These range from storing every point on the outline to storing closely spaced points which can be connected by straight lines to storing only selected "control points" which define the curves and straight lines of a character according to a known set of rules. The use of outline encoding reduces the amount of memory needed to store a typeface and provides a size-independent character representation. However, most output devices will not accept the encoded-outline character data; they require that characters be represented in a so called "bitmap" form, as a list of numbers locating the position of each point in the character shape (i.e., not only every point on the outline, but every point in the interior of the character, as well). A translation or transformation is therefore required from the outline form to the bitmap form.

To understand the nature of this transformation, start by considering the display medium as a rectangular grid of $N \times M$ locations, each location representing a single picture element (or "pixel") which may be turned on (to display a part of a character) or left turned off (to represent background). The state of each picture element can be represented by a single bit whose value is either zero or one (of course, additional bits can be added to represent color, intensity or other attributes). When a character is stored in bitmap form, it is represented in a memory as a bit pattern corresponding to the intended illumination of picture elements on the display. The whole display field is represented in a memory array as an assemblage of bitmap characters.

Smaller-sized characters are made up of fewer pixels than larger characters and have smaller bitmap representations. It is thus necessary to make available for each character which is to be displayable, a separate bitmap representation in each required size. Further, since each bit in the memory corresponds to a selectable pixel location on the display, and pixel locations depend on display resolution, a separate bitmap representation is required for each different resolution output device. Therefore, although the outline representation of a character can be done at a sufficiently high resolution as to be independent of size and display resolution for all practical intents, the bitmap representation is necessarily dependent on the point size to be displayed and the resolution of the output device.

Frequently, important points on the ideal outline locus of a character will fall between the available pixel locations on the display field, requiring that choices be made as to which of the available pixels to use to represent those portions of the outline. And as a character is scaled up or down in size, certain adjustments may have to be made to account for the human visual perception mechanisms which cause the character to be viewed as having specific qualities. For example, as point size is changed, it is often appropriate that the height and width of the character be varied by slightly different scaling factors.

A still further complicating factor is the fact that for typographic consistency, certain characterizing features and relationships between features of different characters must be preserved through the outline-to-bitmap conversion process. For example, the heights of certain portions of specified letters must be kept the same, the widths of certain portions of letters must be maintained in desired relationship, and so forth. Failure to preserve these relationships will cause loss of the typeface's design identity and typographic quality.

The promotion of the appearance of unity between the characters in a typeface has sometimes been accomplished by using conventional signal processing techniques such as filtering. That approach, however, provides improved uniformity (e.g., in the thickness of lines) only at the expense of blurring the image. This is a direct consequence of performing operations on character spectra rather than operating on character features.

The conversion of outline representations of typefaces to bitmap representations of selectable point size and resolution has therefore been difficult to achieve with an automatic system, particularly where typographic design integrity is to be maintained in the bitmap product. High quality conversion has required considerable human "polishing" or editing of any bitmap which has been generated from an outline form by an automated system. This manual editing is, of course, expensive and time consuming. Moreover, since editing is required for each point size, a system cannot be provided with an ability to select an arbitrary point size for type. This restricts the user to just those point sizes for which edited type has previously been created.

It is therefore an object of the present invention to provide a system which can more efficiently convert outline representations of individual characters and typefaces to corresponding bitmaps of those characters and typefaces within a wide range of sizes and display resolutions.

A further object of the invention is to provide a system for conversion of character outline data to corresponding bitmap data with only minimal human intervention or involvement, while maintaining a high level of typographic quality.

Still another object of the invention is to provide an efficient digital font useful for converting into bitmap form character information stored in outline form.

Yet another object of the invention is a to provide a digital font useful for converting into bitmap form character information stored in outline form, based on knowledge of the features of characters rather than their spectral properties.

SUMMARY OF THE INVENTION

The present invention achieves these objectives through the use of a symbolic feature specification system (and resulting digital font) which establishes a bridge between the outline form of the character and the bitmap form. This system links features (both within individual characters and between different characters) and selectively arranges them hierarchically in order of importance. The method used for identifying features provides a size-independent constraint description of characters which is then usable in conjunction with outline character data to translate size- and resolution-independent outline characterizations into character bitmaps at any desired size and resolution.

The feature specification system treats the em-square containing a character as being composed of a hierarchy of zones formed in both the horizontal and vertical directions. The zones are completely character-specific. Each zone defines the extent of some feature of the character, as selected by the operator of a computer-aided design (CAD) station. The available pixels are allocated first to the most important features and then to successively less important features.

The foregoing and other objects, features and advantages of the invention will be more readily understood and apparent from the following detailed description of the invention, which should be read in conjunction with the accompanying drawing, and from the claims which are appended at the end of the detailed description.

BRIEF DESCRIPTION OF THE DRAWING

In the drawing,

FIG. 11 is a listing of an exemplary form of a source file (i.e., a form of digital font) according to the present invention, depicting a listing of the zone hierarchies and constraint functions.

DETAILED DESCRIPTION OF AN ILLUSTRATIVE EMBODIMENT

Figure 1:
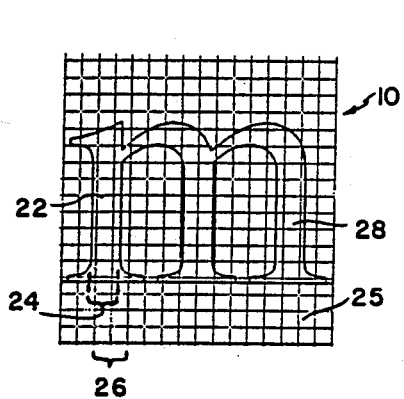
FIG. 1 is a diagrammatic illustration of a high resolution outline of an exemplary letter "m" laid against a much lower resolution grid.

For purposes of illustration, reference is now made to the lower case letter "m" shown in FIG. 1 on a rectangular coordinate grid 10. The grid 10 is intended to represent a medium to low resolution display field for an output device which might be capable of showing, for example, 100–300 dots per inch (dpi). By contrast, the letter "m" is shown as a high resolution outline. Typical outline encoding systems define character features on a coordinate definition system providing several thousand lines to the em. It is not feasible, of course, to show in the drawing a coordinate grid if such density; consequently, only the resulting character outline is illustrated. The assignee of the present invention, Bitstream, Inc., Cambridge, Mass., for example, uses a system providing 8,640 lines to the em in both the horizontal and vertical directions. The outline of the letter "m" (and each other symbol which is to be made available) is encoded at this high resolution and stored in digital form. Various techniques are described in the literature for effecting appropriate digital coding of character outlines; see, for example, J. Flowers, "Digital Type Manufacture: An Interactive Approach," *I.E.E.E. Computer*, Vol. 17, No. 5, May 1984, at 40–48; W. Richmond, "Digital Masters," *Communication Arts*, May–June 1984, at 78–81.

Figure 2:
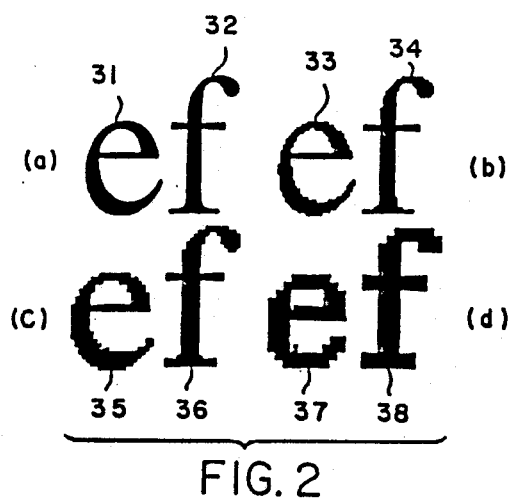
FIG. 2 is a pictorial illustration of the visual effects of different display resolutions and character sizes.

As stated above, the mapping of a character outline from a high resolution form to a lower resolution form is a complex task. With great frequency, features of the outline will not fall directly on available pixels but will, instead, fall between them. This is a direct consequence, of course, of a substantial reduction of resolution from the 8640×8640 line em-square. Consider, for example, the left stem 22 of the letter "m" in FIG. 1. Ideally, the width of the stem might be as represented at brace 24. However, due to the coarseness of the display resolution, it may not be possible to display a segment of that precise width. There are only two alternatives: the stem 22 may be wider or it may be narrower. In the extreme, the choice may have to be made between using one pixel or no pixels (possibly losing the feature entirely, or at least somewhat altering its shape). Thus in FIG. 1, if each box 25 represents one pixel, the stem 22 may be made two pixels wide, as shown by the brace 26, or it may be only one pixel wide. And at the lowest resolutions, curves become virtually non-existent and straight lines dominate. FIG. 2 shows another series of illustrations which demonstrate the inverse relationship between the quality of a digital type image and the output resolution of the output device. In FIG. 2(*a*), the images 31 and 32 were set at 96 points on a 650 dots-per-inch (dpi) output device; the images appear virtually analog to the naked eye. More and more typographic detail is lost as the digital bitmap becomes coarser. FIG. 2(*b*) shows the same characters at 33 and 34, set at eight points on the same 650 dpi display. At twelve points on a 300 dpi display, the corresponding images 35 and 36 are shown in FIG. 2(*c*). Finally, at six points on a 300 dpi display, the images are as presented at 37 and 38 in FIG. 2(*d*), where a great deal of the detail of the analog form has been lost.

Another objective when mapping characters from one resolution to another is to maintain those correspondences between features which give a typeface its visual identity. For example, referring back to FIG. 1, it might be desired that the left and right stems 22 and 28 of the letter "m" have the same relative width (or thicknesses) in the low resolution form as they did in the high resolution form. When a number of such criteria apply to a given character, it may not be possible, as the resolution is decreased, to maintain all of these desired relationships. At that point it is necessary to sacrifice some relationships in order to preserve others. Heretofore there has generally been no way to automate that decision process, so a human operator had to decide which features to sacrifice and when to be satisfied with the reproduction of the character.

Normally, the preservation of relationships between the features of different characters will also be a significant objective. For example, it may be desired to make the width of the left stem 22 of the letter "m" the same as the width of the corresponding portion of the letter "n" (or some other letter). Or one might wish to ensure that the heights of two letters such as a lower case "a" and a lower case "o" are the same. The list of potential relationships is limitless.

Figure 3:
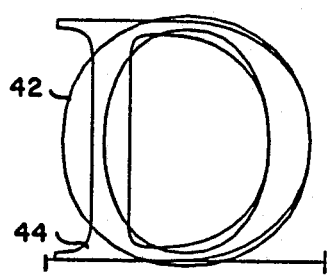
FIG. 3 is a pictorial illustration of an outline for an upper case letter "O" superimposed on an outline for an upper case letter "D" in the same typeface, as they appear on a 100 dpi output device, where the outlines have been encoded at 52,000 dpi effective resolution.

Of course, the maintenance of typographic quality is not simply a matter of mechanically preserving correspondences. In the example shown in FIG. 3, the goal is to generate bitmaps for the analog "O" 42 and "D" 44. At first, the procedure appears to involve a straightforward task of forcing the heights, arch thicknesses and widths of the "O" and "D" to correspond. Consider, however, bitmap versions of those letters which have been produced using customary prior art techniques, as in FIG. 4(A). Distortions are apparent even to an untrained eye. For example, the "O" and "D" are of different heights; even more importantly, the tops of these letters are at different heights. Further, the opening above bottom segment 45*a* of the O (42') is of a different length than the opening below the top segment, 45*b*. And the lower arch 46*a* is shaped differently from the top arch 46*b*. In the D (44'), there is a break 47 in the connection between the upper end of the arch and the stem. And the ends of the lower arch 48*a* and upper arch 48*b* do not terminate symmetrically.

Figure 4:
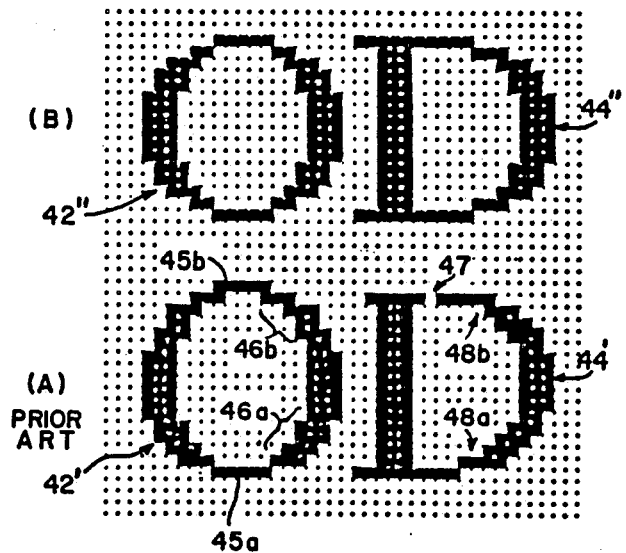
FIG. 4(A) is a pictorial illustration of conventionally generated bitmaps for the letters O and D of FIG. 3.
FIG. 4(B) is a pictorial illustration of bitmaps for the letters O and D of FIG. 3, generated according to the present invention.

By contrast, use of the present invention yields the bitmapped O (42'') and D (44'') of FIG. 4(B). There, symmetry has been maintained and the shapes of the characters correspond as nearly as possible to their analog forms 42 and 44.

Pixel Budgeting Process

According to the present invention, the preservation of correspondences between features in the higher resolution outline version of characters and their lower resolution bitmap counterparts starts with identification of those features and labelling them in the file which defines outline versions of the characters. Thus the initial feature labelling is, at least for most practical purposes, resolution-independent.

Figure 5:
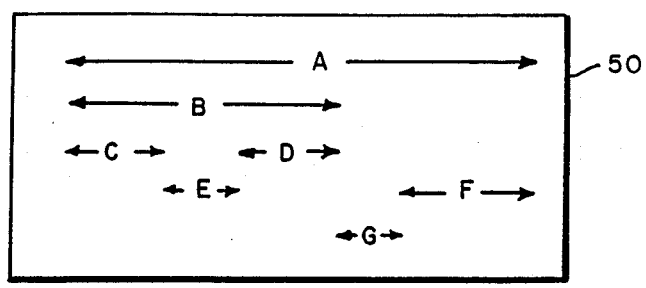
FIG. 5 is a diagrammatic illustration of a zone hierarchy according to the present invention.

Features are identified within the high-resolution character by breaking or "slicing" the em-square containing a character into "zones" of differing lengths in both the horizontal and vertical directions. Each zone establishes a run-length segment which defines the span and Having established the locations of the zones within the high-resolution outline em-square, the conversion process requires that the zones be mapped onto the lower-resolution bitmap em-square. The pixel allocation (or "budgeting") process by which the mapping is achieved will now be illustrated using the zone hierarchy shown in FIG. 5. As a first step, a number of pixels are allocated to the root zone A; the number of pixels is chosen to provide the desired scaling—that is, to allow the character to be produced at the point size which has been selected. For example, if the zone A represents OA outline resolution units (ORU's—i.e., units measured on the normalized grid of, for example, 8640×8640 units) and a seven (7) point character is to be displayed at 300 dots per inch resolution, then the desired number of pixels for zone A, PA, is given by the floating point expression PA=OA*300*7/(8640*72) pixels. In this expression the number 8640 reflects the fact that OA is measured in units of 1/8640 em, the number 72 reflects the fact that there are (approximately) 72 points per inch (the exact number is 72.289).

Once the value of PA is established, so that the number of pixels allocated to the root zone A is known, that number is rounded up or down to the nearest whole number and the number of pixels thus established is then distributed among the root zone's daughter zones B, F and G. The number of pixels PB allocated to the first daughter zone B is given by the formula PB=PA*OB/OA, where OB represents the number of ORU's occupied by the zone B in the high resolution image. Using similar notation, the number of pixels allocated to daughter zone F is given by PF=(PA-PB)*OF/(OA-OB) pixels. Finally, the daughter zone G receives the number of pixels remaining after the PA pixels have been allocated to all other daughter zones of zone A. Thus, PG=(PA-PB-PF)*OG/(OA-OB-OF), where OG__=__OA-OB-OF.

The rate of exchange between outline resolution units and bitmap pixels can vary from one level to the next due to the operation of rounding upward or downward in order to arrive at a whole number of pixels for each zone.

Continuing down the hierarchy, the number of pixels in each of zones B, F and G is allocated to their daughter zones (if any). Thus, the number of pixels allocated to zone B is distributed over its daughter zones C, D and E. Daughter zone C is allocated pixels according to the formula PC=PB*OC/OB; daughter zone D is allocated to pixels according to the pixels according to the formula PD=PB*OD/OB; and daughter zone E is allocated to the remaining pixels—i.e., PE=(PB-PC-PD)*OE/(OB-OC-OD). The rate of exchange from outline resolution units to pixels is the same for zone C and D since they are on the same level. However, because the zone E is the last daughter zone of zone B, it receives the number of pixels remaining after the other daughter zones have been allocated pixels.

When all zones have been allocated an integral number of pixels, the terminal, non-parent zones are sorted by starting position. This allows absolute pixel assignments to be made for each zone boundary. The pixel assignments then may be interpolated linearly to map any outline resolution unit value into the corresponding position in pixel space. The mapped values are used for scan conversion in place of the usual linear steps.

Figure 6:
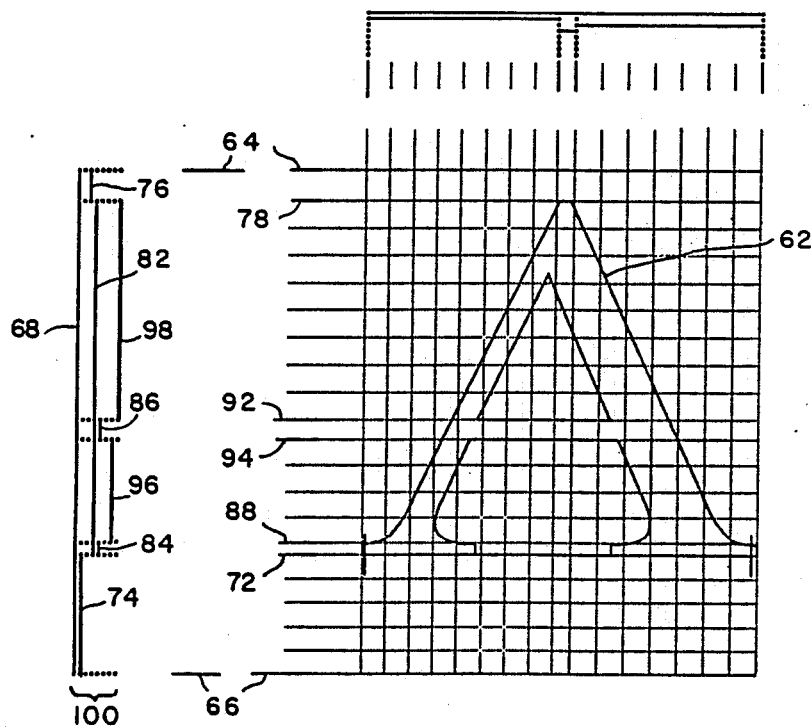
FIG. 6 is a zone hierarchy for the letter "A", in accordance with the present invention.

As an example, FIG. 6 illustrates how zone assignments might be made, using the upper case letter "A" as a test case. To make the zone assignments, the outline form of the character 62 is displayed on the CAD workstation screen and the operator moves a pointer to successive locations which he then labels as the beginnings and ends of zones. At the same time, he establishes the parent-daughter relationships between the zones, giving each zone a level designation. The zone definitions are thus originally established in terms of ORU's, for subsequent mapping to pixels. As indicated in the Figure, the markers 64 and 66 denote the upper and lower bounds of the vertical root zone, the span of which is shown by the line 68 on the left. The first vertical daughter zone is marked by the lines 72 and 66, and spans the interval marked by the line 74. The second daughter zone of root zone 68 appears at the span 76, between markers 64 and 78. Root zone 68 also has a third daughter zone 82, spanning the space between markers 78 and 72. Neither zone 74 nor zone 76 has any daughters; howver, zone 82 has four daughters. The first two of its daughters, zones 84 and 86, have the same priority in the zone hierarchy. They span, respectively, markers 88 to 72 and 92 to 94. The next lower level in the hierarchy is zone 96, which runs from marker 94 to marker 88; and the lowest-priority is given to zone 98, which runs from marker 78 to marker 92. The order within the vertical zone hierarchy is shown graphically by placement of the zones along the scale 100. A similar zone assignment operation is made in the horizontal direction.

Alternatively, the zone assignment process need not require significant operator involvement. It may also be automated, fully or partially, by using artifical intelligence techniques to identify features in characters. For example, features can be found by looking for maxima and minima, inflection points, corners and other mathematically identifiable relationships between points.

Feature Linking

As stated above, a feature of a given character may be related—or linked—to a feature of another character. Thus, the number of pixels allocated to a particular zone may depend on the number of pixels allocated to one or more other zones in the same character or in one or more other characters. To effect these relationships, the operator may label a zone with a symbolic name representing its length. For example, the maximum thickness of the right hand portion of the arch in the letter O (42) in FIG. 3 may be defined to correspond to the maximum thickness of the arch in the letter D (44). In turn, features of the latter character could depend on features of still a third character.

While various zone-naming systems may be employed, it is convenient to use a nomenclature which, regardless of form, identifies the letter from which the zone is to be taken and the specific zone within that letter. For example, a designation which is interpreted as "the third zone in the lower case g" is useful and easily understood.

In performing the hierarchical allocation of pixels to the zones of a letter, there will in many instances come a time when a zone will be encountered (the referencing zone) which references another zone (the referenced zone). It will not be possible to continue the pixel allocation for the subject letter until the pixel allocation process has been completed for the appropriate portion of the letter containing the referenced zone. To impart some order to the pixel allocation process, various procedures may be employed for branching through the characters when referencing zones are encountered. The preferred procedure involves use of a tree structure.

With a tree approach, the first time a reference is encountered to a zone in another character, control branches to the referenced character and the allocation is performed for just so much of the referenced character as is required in order to complete the referenced zone. Once the allocation has been made for the referenced zone, control passes back to the referencing character, at the point where its allocation operation was interrupted. The allocation process then proceeds for the referencing character until the character is completed or another referencing zone is encountered. When a referencing zone is encountered, it is also possible that the referenced zone (the first referenced zone) is a referencing zone, itself, referring to still a third zone (the second referenced zone) for its size. In this situation, the pixel allocation to the second referenced zone must be completed first, then the allocation to the first referenced zone is completed, and only then does control revert to the first referencing zone for completion of the associated letter.

Once a hierarchical structure has been developed for a letter, advantage may be taken of the fact that even for different typeface designs (or variations of the same design, such as italics and boldface), the same letter will possess a number of similar identifying features. Thus, certain corresponding zones can be identified automatically and copied from the hierarchical structure of a first character to the hierarchical structure of another character (which may be the same character or another character which shares some features with the first character). Using this approach, it is possible to automate the process of generating hierachical information.

Irrespective of the allocation sequence which is employed, the zone allocation operation is performed independently in the horizontal direction and in the vertical direction; of course, horizontal zones may be linked to vertical zones, and vice versa. Further, as a general matter, a different resolution and different scaling may be used in each of those directions. This is important not only because it allows a great deal of flexibility in adapting to displays of varying characteristics, but also because slightly different aspect ratios generally are desired for different point sizes of type.

The length of each zone is stored in two forms. The first form is the unrounded value, which is a floating point number corresponding to the magnitude of the length in pixels; the second form is the rounded value, which is a fixed point number. Various functions, termed "constraint functions", extract either the rounded value or the unrounded value, or both, to use in calculating the size of a target zone, in pixels.

Figure 7:
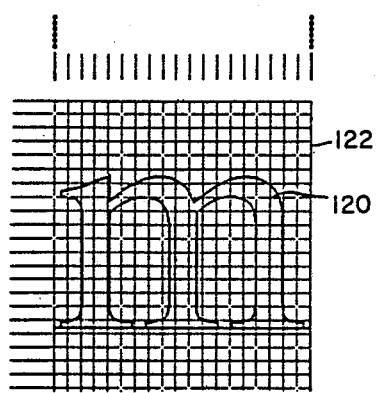
FIG. 7 is a diagrammatic illustration of an outline representation for the letter "m", against a low resolution display for which a bitmap of the "m" is to be generated.
Figure 8:
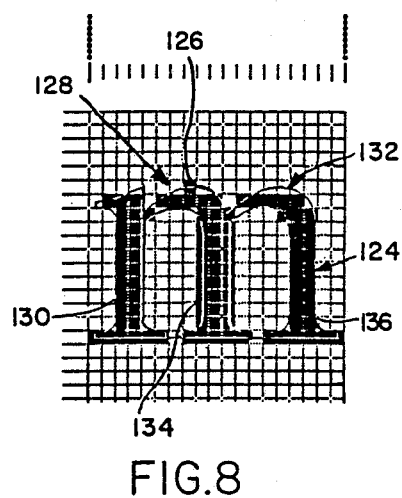
FIG. 8 is a diagrammatic illustration of the bitmap of the letter "m" of FIG. 7, generated by conventional techniques.

The overall impact of the pixel budgeting and feature linking operations will now be illustrated with reference to FIGS. 7-10. In FIG. 7, a bitmap is to be generated for the letter "m" from the outline form 120. Each square in the 19×23 em-square grid 122 represents one of the pixels available on the output device. The outline thus encompasses both complete pixels and portions of pixels. According to the customary prior art approaches, when a portion of a pixel is contained within the outline, that pixel may or may not be illuminated, depending on how much of the pixel area is enclosed. Pixels falling completely within the outline are, of course, illuminated (i.e., become part of the bitmap). Using such a system, the outline 120 yields the bitmap 124 which comprises the blackened pixels in FIG. 8. Some interesting features of bitmap 124 should be noted. First, the two arches of the "m" are not identical; the left arch has a single pixel 126 sticking up from the top, but there is no corresponding feature in the right arch. The difference is due to the slight difference in the areas of the squares "swept out" by the tops of the arches. Second, the connection between the arch 128 and stem 130 is not the same as the connection between arch 132 and stem 134. Third, stem 134 is three pixels wide, whereas stems 130 and 136 are two pixels wide; in the outline form, they are all of the same width.

Figure 9:
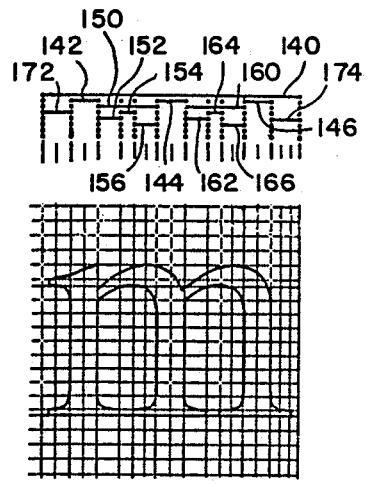
FIG. 9 is a diagrammatic illustration of zone hierarchy, pixel budgeting and zone linking according to the present invention, applied to the letter "m" of FIGS. 7 and 8.
Figure 10:
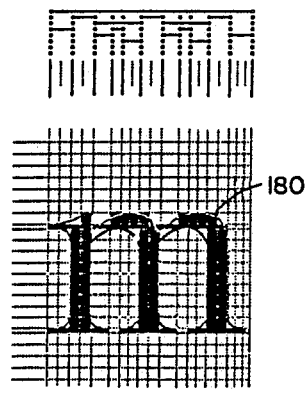
FIG. 10 is a pictorial illustration of the bitmap produced by the zone and pixel assignments of FIG. 9.

FIG. 9, by contrast, shows the bitmap which results when the pixel budgeting and zone linking processes of the present invention are employed. Referring to the horizontal (i.e., x-directed) zone assignments at the top of the illustration, root zone 140 has several daughter zones, including the three daughter zones 142, 144 and 146. Each of these daughter zones defines the width of one of the stems. Using the linking process, the three zones 142, 144 and 146 are constrained to have the same number of pixels. Similarly, a family of zones is provided for each of the arches. The two families comprise zone sets (150, 152, 154 and 156) and (160, 162, 164, and 166). Finally, zones 172 and 174 receive the remainder of the pixels. The number of pixels allocated to each zone appears in a row at the top of the em-square. The resulting bitmap appears in FIG. 10 at 180.

In FIG. 9, it may be observed that the pixels are distorted; that is, they are shown as of varying sizes. That is intentional. The distortion is a device to show the rounding operations which the system executes, as well as the operations performed on or with the remainders which result from the rounding operations. Fractional remainders may be collected together and accumulated until additional integral numbers of pixels become available. And fractional numbers of pixels may be "stolen" from lower zones in the hierarchy to make up an integral number at a higher level. The bitmap characters produced by this invention are intended, of course, to be rendered by uniformly rectangular pixels on a particular output device.

In a preferred implementation, each zone definition contains seven fields. These are: the FROM field, the TO field, the PROPAGATE FLAG field, the NEW LEVEL FLAG field, the CONTINUE FLAG field, the MINIMUM ZONE SIZE field, the CONSTRAINT FUNCTION SIZE field, and the CONSTRAINT FUNCTION field. Each of these fields will be discussed in turn.

The FROM field specifies the start coordinate of the zone (i.e., the x-coordinate or the y-coordinate, as appropriate) in outline resolution units ("ORU's") which correspond, for example, to 1/8640 em. The TO field specifies the ending coordinate of the zone in ORU's. By convention, the numerical value of the TO zone is always greater than that of the FROM zone—i.e., each zone is deemed to run from a lower-valued starting location to a higher-valued ending location, to avoid ambiguity. Thus, the size of a zone may always be calculated from the value of TO-FROM.

The PROPAGATE FLAG (PROP FLAG) field indicates whether the zone is a parent zone. If so, the value in the field is set to one; otherwise, it is zero.

The NEW LEVEL FLAG field also can have only the values zero and one. It is set to zero to indicate that a new rate of exchange from ORU's to pixel is to be computed, taking into account the result of pixel assignments to the preceding zone or zones. If the same rate of exchange used in the preceding zone is to be used in the current zone, the field is set to zero.

The CONTINUE FLAG field contains a one if there are more zones in the current group and a zero if there are no more zones. Thus, it indicates whether or not the current zone is the last zone in a group.

The MINIMUM ZONE SIZE field indicates the minimum number of pixels to be assigned to a zone. When the calculated number of pixels is less than this value, the minimum value is substituted for the calculated number.

The CONSTRAINT FUNCTION SIZE field indicates the number of items in the CONSTRAINT FUNCTION field. A zero indicates that no CONSTRAINT FUNCTION items are to be read. The CONSTRAINT FUNCTION field consists of a series of items. Each item may be a value or a function. During execution, values are loaded onto an execution stack, functions are executed using the arguments obtained from the execution stack and results are "pushed" onto the execution stack. In an exemplary system, thirteen constraint function item types have been defined: a P item; an F item; floating point constants; a CO function; a CF function; an RRFS function; an RRHS function; a FIXR function; a FIX function; an addition function; a subtraction function; a multiplication function; and a division function.

A P item represents the whole number of pixels allocated to the specified zone of the specified character. The value of a P item is pushed onto the execution stack Semantically, a P item is represented as "P char id zone number ".**

An F item represents the floating point number of pixels allocated to the specified zone of the specified character. Its value is pushed onto the execution stack. Semantically, an F item is represented as "F char id zone number "**.

The value of a floating point constant does not require any special semantic notation; it is simply pushed onto the execution stack.

The CO, CF, RRFS and RRHS functions are exemplary typographic functions. More typographic functions can be added and others can be substituted, at the user's desire.

The CO function takes three arguments from the execution stack and returns a whole number of pixels. The variable names of the three arguments, in the order in which they are pushed onto the stack, are: "threshold", "fpixels_self", and "pixels other". If fpixels_self differs from pixels_other by less than threshold, pixels_other is returned to the stack; otherwise, fpixels_self is rounded to the nearest whole number and the rounded value is returned.

The CF function takes three arguments from the execution stack and returns a whole number of pixels to the stack. The variable names of the three arguments, in the order in which they are pushed onto the stack, are: "threshold", "fpixels_self", and "fpixels_other". If fpixels_self differs from fpixels_other by less than the threshold, the average value of fpixels_self and fpixels_other is rounded to the nearest whole number and returned as the result; otherwise, a combination of rounding up or down for fpixels_self and fpixels_other is chosen whose ratio most closely approximates the ratio of the unrounded values.

An RRFS function also takes three arguments from the (see hard copy for handwritten symbols) execution stack and returns a whole number of pixels. The variable names of the three arguments, in the order in which they are pushed onto the stack, are: "pixels_other_footspace", "pixels_my height", and "pixels_other_height". The value of pixels_other_footspace is reduced by half the difference between pixels_my_height and pixels_other_height. The result is rounded to the nearest whole number and pushed onto the stack.

An RRHS function also takes three arguments from the execution stack and returns a whole number of pixels. The variable names of the three arguments, in the order in which they are pushed onto the stack, are: "pixels_other_headspace", "pixels_my height", and "pixels_other_height". The value of pixels_other_headspace is reduced by half the difference between pixels_my_height and pixels_other_height. The result is rounded down to the nearest whole number and pushed onto the stack.

The FIXR, FIX, addition, subtraction, multiplication and division functions are arithmetic functions. This set of functions may be augmented, and a different set of arithmetic functions may be selected if corresponding changes are made to the set of typographic user functions.

An FIXR function takes one argument from the execution stack, rounds it to the nearest integer and pushes the result back onto the stack. A FIX function takes one argument from the execution stack, rounds it down to the next lower whole number and pushes the result back onto the stack. An addition function takes two arguments from the execution stack, adds them together and pushes the result back onto the stack. A subtraction function takes two arguments from the execution stack, subtracts the first (i.e., the argument originally at the top of the stack when the function was called) from the second and pushes the result back onto the stack. A multiplication function takes two arguments from the execution stack, multiplies them together and pushes the result back onto the stack. A division function takes two arguments from the execution stack, divides the first argument into the second and pushes the result back onto the stack.

When all of the items in a constraint function string have been executed, the one remaining item on the stack is the number of pixels to be allocated to the zone which contains the constraint function.

The direct result of the pixel allocation and zone definition/linking processes is a body of information constituting a series of steps which will yield the desired bitmap. This information may be embodied in a variety of forms. One embodiment which has proven useful is a source file listing of instructions and arguments. This source file, too, can assume numerous forms. In one exemplary form, a source file may have a format such as that illustrated in FIG. 11. Of course, as will be apparent from the discussion below, not all of the information contained in FIG. 11 is required. Some of it is optional. The first field 120 simply identifies the character set or font. It is followed by a field 122 which specifies the number of characters in a set. In the example, this is 181. Following this figure is a set of data for each character, beginning with a character identification number, such as at 123. Each set of data consists of the hierarchy for the x-oriented zones 124 followed by the hierarchy for the y-oriented zones 126. Each zone hierarchy consists of the number of zones (e.g., at 128x and 128y) followed by the corresponding number of zone definitions.

As shown in FIG. 11, seven zone definitions are used. In the first column, the FROM value—i.e., the starting location for the zone—is given. This is followed by the TO field value—i.e., the ending location for the zone. Next, the P, L and C flags (PROPAGATE, NEW LEVEL and CONTINUE, respectively), the MINIMUM ZONE SIZE (labelled "MIN") and the CONSTRAINT FUNCTION SIZE field (labelled "FSIZE").

In this example, none of the x-zones for the first character (collectively identified at 124) reference any other zones; they are all self-contained. However, several of the y-zones for that character do reference other zones. For example, the second of the y zones (i.e., the one extending from −2043 to 0), the number 4 in the "FSIZE" column indicates that there are four items in the constraint function field. The four items are shown at 132, 134, 136 and 138 under the heading "FUNCTION". Items 132, 134 and 136 are arguments, while item 138 is a function designation which calls the CO function. Items 134 and 136 refer, respectively, to a floating point number of pixels, allocated to zone 1 of character 001 and to the integer number of pixels allocated to zone 1 of character 008, respectively.

The second character in the font or character set begins at 142. It is presented in the same format. Referring briefly to the fifth of the y-zones for the second character, an example is given of zone specification having eight items in the constraint function list. These eight items are shown at 144-158; specific attention is drawn to the fact that each mathematical operator is treated as a separate item in the constraint function listing.

The type of file structure shown in FIG. 11 is thus one example of a linear specification for such a tree structure.

Another Understanding of the System

With the foregoing description as background, it will be appreciated that the present invention may be viewed as having established a unique information-preserving "lens" or transformation. The transformation takes as input a character in a high-resolution image space and provides as output an image of the character in a lower-resolution target space. It may be helpful to consider the system as being somewhat like an optical system which employs a compound lens structure comprising one or more elements. The "compound lenses" are not generalized, though; they are separately configured for each character.

Each element of the lens acts upon a horizontal area or a vertical area spanning the high-resolution image. These elements are the zones, corresponding to features of the image; they act independently to "focus" or manipulate the size of character features. This permits important features to be rendered with minimal distortion while less important features may be rendered with greater distortion if need be. The simulated optical elements which make up the "lens" may be either piecewise linear (as in the description above) or they may be non-linear. In the case of non-linear elements, nonuniform distortion will be produced by the elements. While non-linear elements would complicate the system, they have the advantage of being able to render smoother curves.

Most significantly, these "lenses" can be generated automatically, through the application of a constraint system to a pair of interrelated networks. These networks represent the knowledge base which drives the system. The first network is a hierarchy of character features and determines, in a size-independent fashion, the placement and the hierarchy of feature importances relative to one another within a character. The second network comprises a definition of interrelationships (e.g., constraint functions) between character features and enforces relationships between repeated features of characters across a typeface.

Having thus described a specific illustrative embodiment of the invention, it will be readily apparent that various alterations, substitutions and modifications will occur and be obvious to those skilled in the fields of computer graphics, typography and digital typography. All of such obvious alterations, substitutions and modifications are intended to be suggested herein and encompassed within the protection sought hereby. Accordingly, it is intended that this disclosure be read as being exemplary only, and not as limiting. Thus the invention is to be limited only by the claims which follow hereafter.

What is claimed is:

1. A digital font for use in generating a bitmap representation of a selected character from a digital representation of the outline of said character, comprising, in a digital storage medium having a plurality of locations capable of storing digital information:
   a first set of storage locations containing data representing a hierarchy of x-oriented zones, each such zone corresponding to a typographic feature of the character;
   a second set of storage locations containing data representing a hierarchy of y-oriented zones, each such zone corresponding to a typographic feature of the character; and
   in each of the first and second sets of storage locations, the data representing the respective hierarchies of x-oriented zones and y-oriented zones including data representing the number of zones in each respective hierarchy and, for each zone in the hierarchy, data defining a zone definition comprising parameter values descriptive of said zone.

2. The font of claim 1, wherein each zone definition includes data representing a starting location for the zone and data defining an ending location for the zone.

3. The font of claim 1 or claim 2, further including at least one storage location containing data representing a constraint function field defining at least one zone of the character in terms of at least one zone of another character.

4. The font of claim 1 or claim 2, further including at least one storage location containing data representing a constraint function field defining at least one zone of the character in terms of at least one other zone of the character.

5. a digital font for use in generating a bitmap representation of a selected character from a digital representation of the outline of said character, comprising, in a digital storage medium having a plurality of locations capable of storing digital information:
   a first set of storage locations containing data representing a set of x-oriented zones including at least one x-oriented zone, each such zone corresponding to a typographic feature of the character;
   a second set of storage locations containing data representing a set of y-oriented zones including at least one y-oriented zone corresponding to a typographic feature of the character; and
   in each of the first and second sets of storage locations, the data representing the respective y-oriented zones and y-oriented zones including data representing the number of zones in each respective set and, for each zone in the set, data defining a zone definition comprising parameter values descriptive of said zone.

6. A method for use in generating a low resolution bit map representation of a character at a selectable resolution and point size from an outline represenation thereof relative to a high-resolution em-square to provide a low-resolution bit map character representation of consistent and aesthetically pleasing appearance, comprising the steps of:
   for at least one dimension of the character, slicing the em-square into a plurality of zones, each zone corresponding to a typographic feature of the character; and
   for each zone, scaling the features of the character within said zone by allocating thereto a number of pixels in the low-resolution bit map.

7. The method of claim 6 wherein a scaling factor is uniquely associated with each zone.

8. The method of claim 6 or claim 7 wherein the step of scaling the features of the character includes the step of mapping the extent of each zone in the high-resolution em-square to an integral number of pixels in the low-resolution bitmap.

* * * * *